June 22, 1937.  G. MORGAN  2,084,406
VEHICLE DRIVE
Filed Jan. 4, 1935
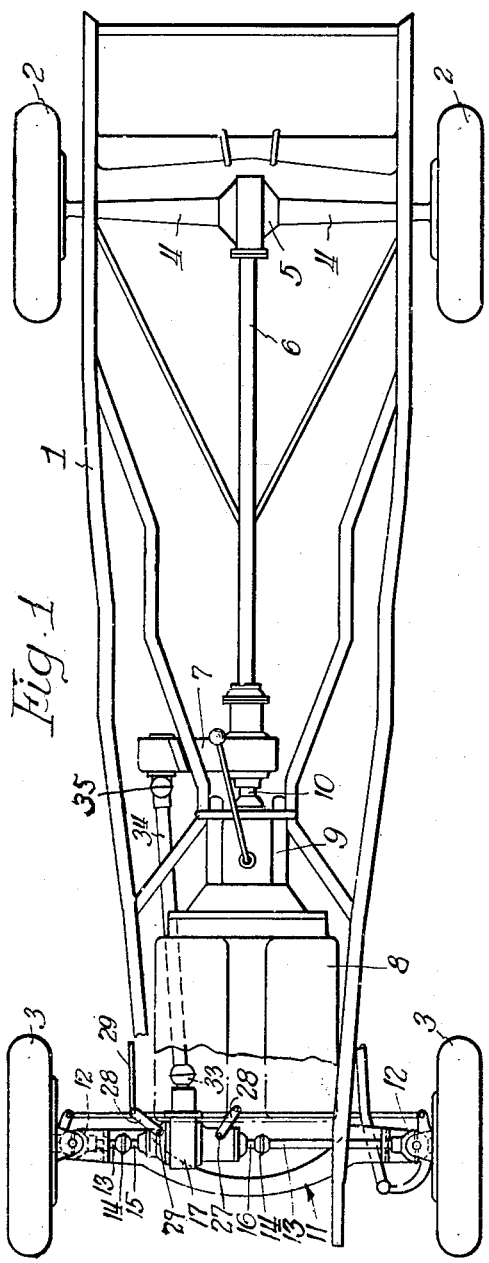
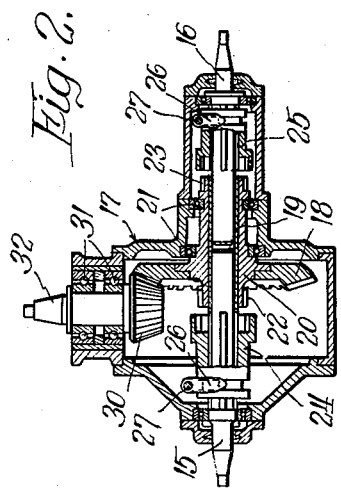
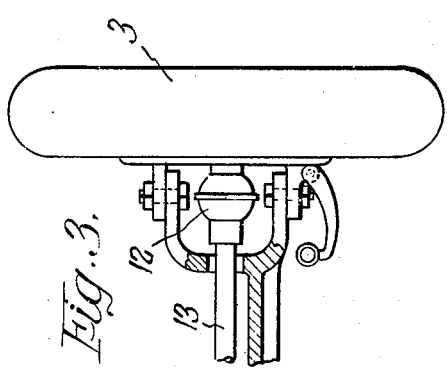
Inventor:
Guy Morgan.
By Brown, Jackson, Boettcher & Diener
Attys Patented June 22, 1937

2,084,406

UNITED STATES PATENT OFFICE 2,084,406

VEHICLE DRIVE

Guy Morgan, New York, N. Y.

Application January 4, 1935, Serial No. 367

8 Claims. (Cl. 180—44)

This invention relates to means for driving vehicles, particularly motor trucks. It is directed to the provision of driving means whereby positive traction may always be assured. Further advantages will appear from the detail description.

In the drawing:—

Figure 1 is a plan view of an automobile chassis embodying driving means in accordance with my invention;

Figure 2 is a horizontal axial sectional view, on a larger scale, through the front wheel drive means; and Figure 3 is a fragmentary front view, on a larger scale, showing the dirigible mounting of the front wheels.

The frame is indicated at 1. This frame is supported upon a pair of rear wheels 2 and a pair of dirigible front wheels 3. The rear wheels 2 are suitably secured upon the outer ends of the rear axle disposed within a housing 4 and driven through a differential 5 from a propeller shaft 6 which is driven from a unit 7 suitably supported on the chassis 1. The differential 5 and the propeller shaft 6 are of usual and known construction and need not be illustrated or described in detail, it sufficing to say that the rear wheels 2 are driven in the usual manner by means of a differential and propeller shaft of known type.

The unit 7 is in the nature of an auxiliary transmission and also serves as a gear reduction and transfer unit. Units of this general type are known in the art, and any suitable unit may be employed, and it need not be illustrated or described in detail.

A prime mover, such as an internal combustion engine 8, is suitably mounted at the forward portion of frame 1 and has driving connection, in known manner, to a main transmission 9 of known type. This main transmission has driving connection through a shaft 10 to the unit 7, it being understood that this shaft and the propeller shaft 6 are provided with suitably disposed universal connections, as is usual.

The front axle structure, indicated in its entirety by reference number 11, is, in general, of known type and need not be described in detail except as to those parts thereof which have to do particularly with my invention. The front wheels 3 are dirigibly mounted, as indicated, for steering purposes, and are turned as required by suitable steering means of known type. Wheels 3 are connected by means of universal joints 12, of known type, to the outer ends of axles 13. The inner ends of axles 13 are connected by universal joints 14 to the outer ends of stub shafts 15 and 16 rotatably mounted by anti-friction bearings in a suitably shaped casing 17. The stub shafts 15 and 16 are disposed coaxially, and a bevel gear 18 is mounted on the inner end portions of the stub shafts 15 and 16, these portions of the stub shafts receiving a suitable bushing 19 disposed within elongated hub 20 of gear 18. Anti-friction bearings 21 are suitably disposed within gear casing 17 and coact with the inner portions of the stub shafts for supporting the gear for rotation independently of the stub shafts.

Hub 20 of gear 18 is provided, at its ends, with clutch elements 22 and 23 adapted for cooperation with clutch members 24 and 25 splined on stub shafts 15 and 16, respectively, and movable lengthwise thereof into and out of engagement with the clutch elements of the gear. Shift forks 26 engage in circumferential grooves formed in the respective clutch members, each of these forks being provided with a shank 27 which extends through the upper portion of casing 17, and an arm 28 is secured upon the upper end of each shank. An operating rod 29 is connected to the free end of each arm. The rods 29 are extended to a suitable position accessible to the driver of the vehicle, and may be operated to move the clutch members 24 and 25 into and out of operative positions. The clutch members 24 and 25 are independently operable, and the gear 18 is normally free from the stub shafts 15 and 16. This provides simple and efficient means whereby driving connections may be established between either or both of the front wheels 3 and the gear 18, at the option of the driver of the vehicle.

Gear 18 meshes with a bevel pinion 30 on stub shaft 32 rotatably mounted in gear casing 17 by means of suitable anti-friction bearings 31. Stub shaft 32 is connected by a universal joint 33, to the forward end of a shaft 34 driven from unit 7, this shaft being provided, at its rearward end, with a universal joint 35 of known type. The unit 7 is a gear reduction unit, as previously noted, it being understood that the rear wheels 2 and the front wheels 3, when the latter are driven, are driven in the same direction through unit 7 at the same road speed.

It is intended that, under normal operating conditions, the rear wheels 2 are driven in the usual manner and the inner front wheel 3 is also driven. That is to say, when the vehicle is driven at the righthand side of the road or highway, the lefthand front wheel is driven by moving clutch member 25 into engagement with clutch element 23 of the gear 18, while the righthand front wheel is free running. This provides a three-wheel drive for the vehicle, in which the lefthand front wheel is positively driven, the righthand front wheel running freely. If the vehicle is being driven on the lefthand side of the road or highway, the inner or righthand front wheel is driven, the outer or lefthand front wheel running freely. The clutch means associated with the gear 18 renders it possible to establish a direct and positive driving connection between either of the front wheels 3 and the shaft 34, and there being no differential for the front axle.

One advantage of a three-wheel drive, as above, is that it reduces the likelihood of slippage or skidding on wet or slippery surfaces. A further advantage is that the vehicle holds the road better, particularly when driving on a road which is steeply crowned, and the driven front wheel is disposed away from the edge of the road so as to obtain good traction. Also, by having one front wheel driven and the other free running, steering is not interfered with and the necessity of providing a differential for the front wheels is eliminated, while obtaining the advantages of positive drive for the front wheel.

In the event of the automobile being so situated that one of the rear wheels 2 is disposed upon a wet surface, or in material which permits of this wheel spinning, which is not an uncommon experience, the traction provided by the positively driven front wheel will aid to pull the vehicle out of its difficulty. If desired, both of the front wheels can be driven positively from the gear 18.

While I have illustrated my invention, by way of example, as applied to a four wheel rear drive vehicle of known type, it is not so limited since, in its broader aspects, my invention is applicable to vehicles having various types of drives, including vehicles having a front wheel drive of known type. It will be apparent to those skilled in the art that variations may be resorted to without departing from the field and scope of my invention, and I intend to include all such variations as fall within the scope of the appended claims, in this application in which the preferred form only of my invention is disclosed.

I claim:—

1. In a vehicle, a prime mover, a pair of rear wheels, a pair of dirigible front wheels, a driving connection between said prime mover and said rear wheels, and means effective in the normal operation of the vehicle for optionally establishing a driving connection between said prime mover and either or both of said front wheels in all positions thereof.

2. In a vehicle, a prime mover, a transmission connected therewith, a pair of rear wheels, a propeller shaft and a differential connected between said transmission and said wheels, a pair of dirigible front wheels, and a direct drive between said transmission and one of said front wheels in all positions thereof, the other of said front wheels running free independently of the direction of travel of the vehicle.

3. In a vehicle, a prime mover, a transmission connected therewith, a pair of rear wheels, a propeller shaft and a differential connected between said transmission and said wheels, a pair of dirigible front wheels, and means effective in the normal operation of the vehicle for optionally establishing driving connection between said transmission and either or both of said front wheels independently of the direction of travel of the vehicle.

4. In a vehicle, a prime mover, a transmission connected therewith, a pair of rear wheels, a propeller shaft and a differential connected between said transmission and said wheels, a pair of dirigible front wheels, and means effective in the normal operation of the vehicle for optionally establishing direct positive driving connection between said transmission and one of said front wheels independently of the direction of travel of the vehicle.

5. In a vehicle, a prime mover, a transmission connected therewith, a pair of rear wheels, a propeller shaft and a differential connected between said transmission and said wheels, a pair of dirigible front wheels, an independent axle for each of said front wheels, coaxial stub shafts disposed between said axles substantially coaxially therewith and attached thereto at their outer ends, a gear mounted on the inner end portions of said stub shafts for relative rotation and provided at each end with a clutch element, a driving connection between said gear and said transmission, and clutch members splined on said stub shafts and independently movable into and out of engagement with said clutch elements of said gear.

6. In a vehicle, two pairs of wheels, a prime mover, a driving connection between said prime mover and the wheels of one of said two pairs of wheels, and means effective in the normal operation of the vehicle for optionally establishing a driving connection between said prime mover and either or both of the wheels of the other of said two pairs of wheels independently of the direction of travel of the vehicle.

7. In a vehicle, two pairs of wheels, the wheels of one pair being dirigible, a prime mover, a driving connection between said prime mover and the other pair of wheels, and means effective in the normal operation of the vehicle for optionally establishing a driving connection between said prime mover and either or both of said dirigible wheels independently of the direction of travel of the vehicle.

8. In a vehicle, a prime mover, four ground wheels two of which are dirigible, and means for driving the other two of said wheels and for optionally driving either or both of said dirigible wheels, from said prime mover.

GUY MORGAN.